Patented June 6, 1950

2,510,762

UNITED STATES PATENT OFFICE 2,510,762

THERMOSETTING UREA-FORMALDEHYDE MOLDING COMPOSITION

John Kenson Simons, Toledo, Ohio, assignor to Libbey-Owens-Ford Glass Company, Toledo, Ohio, a corporation of Ohio No Drawing. Application March 19, 1948, Serial No. 15,973

3 Claims. (Cl. 260—17.3)

The invention relates to a thermosetting composition comprising a urea-formaldehyde reaction product and a novel potentially acid curing catalyst.

When a thermosetting composition is shaped in a mold under pressure at an elevated temperature, it first softens and then hardens at the molding temperature. In contrast, a thermoplastic composition that is hot-molded remains soft until the molded piece is cooled. Thus an article can be molded from a thermosetting composition by simply placing the composition in a hot mold, closing the mold under pressure, and then after a relatively short time removing the finished article while the mold is still hot. The molding of an article from a thermoplastic composition presents a more complex problem, because an article molded from such a composition must be cooled before the mold is opened to prevent blistering and other deformation which would occur if the mold were opened while the thermoplastic material was still hot.

The length of time for which a molding composition must be left in the mold is one of the factors determining the cost of articles molded from the composition. A composition that must be left in the mold twice as long as another composition requires about twice as much molding equipment for the same volume of production, and hot-molding equipment is expensive.

In the presence of an acid substance, a urea-formaldehyde reaction product is thermosetting; i. e., it is "cured" or transformed by heat from a fusible composition into an infusible resin. In order to cause such transformation to take place, an acid substance must be present to act as a catalyst. In the molding of an article from a urea-formaldehyde composition, it is necessary to leave the composition in the hot mold for a short time after the mold has been closed in order to complete the transformation to the infusible resin so as to produce an article of optimum quality. The length of time for which it is necessary to leave a urea-formaldehyde composition in the mold varies with the degree of acidity produced by the acid substance serving as a catalyst: the more acid the composition, the shorter the "cure time," i. e., the time required to complete the transformation to an infusible resin in the hot mold. There is, of course, a demand for urea-formaldehyde molding compositions which, in a relatively short time after the mold has been closed, are converted completely into an infusible resin so that the finished article can be removed from the mold.

In spite of the necessity for acidity during the molding of a urea-formaldehyde composition, a urea-formaldehyde composition cannot be supplied in an acid condition by a manufacturer, because a urea-formaldehyde composition if acid would be unstable in storage. If it were acid, a urea-formaldehyde composition gradually would become infusible at ordinary temperatures, and could not be sold by a manufacturer because it would be infusible and worthless by the time it reached the hands of a molder.

Even slight acidity which causes the composition to become infusible very gradually would make the composition commercially unacceptable, because the plasticity and other molding properties of the composition then would be wholly dependent upon the atmospheric temperature prevailing and the number of hours elapsing between the production of the composition by the manufacturer and the molding of the composition by the user. A user who molds articles from a urea-formaldehyde composition must select a composition of the proper plasticity and test the composition by molding it under various conditions to determine the exact conditions required to give the desired results. In order to maintain the quality of the product, he then must continue to use a composition of exactly the same plasticity and to mold it under exactly the same conditions. If the composition used by the molder is unstable and has molding properties that vary with the length of time elapsed since the composition was produced, it is impossible for the molder to mold successive articles from the composition with satisfactory results.

A "potentially acid" substance in a urea-formaldehyde composition is an ingredient that causes the transformation of the composition to an infusible resin in a hot mold, but does not materially impair the stability of the composition in storage at ordinary temperatures prior to hot molding. Such a substance is very rare. A potentially acid substance may be alkaline, neutral or so slightly acid at ordinary temperatures that it does not acidify appreciably a urea-formaldehyde composition when added thereto. It is believed that such a substance breaks up or undergoes molecular rearrangement to form an acid, but does not do so until the molding temperature is reached. In order to act as a curing catalyst, the acid so formed must be strong enough to cause the transformation of the urea-formaldehyde reaction product into an infusible resin.

A urea-formaldehyde molding composition contains an appreciable amount of moisture and frequently is kept in storage for weeks at a time before being used. Many substances that might be expected to decompose to form acids under the molding conditions suffer the same decomposition within a few hours after being intimately mixed with a urea-formaldehyde composition, and therefore are actually acid and not potentially acid in the composition. Moreover, the behavior of a substance when present as a minor ingredient in a molding composition and subjected to molding pressure at the molding temperature of 270° to 330° F. cannot be predicted from its behavior when subjected by itself to such a temperature under atmospheric pressure. Usually a substance that does not impair the stability of a molding composition fails to cause transformation of the composition to an infusible resin in a hot mold.

The thermal decomposition of a sulfonate ester appears to be a reaction which involves rupture of the molecule at the ester linkage. However, the ease with which such rupture takes place varies substantially with different sulfonates. For example, phenyl p-toluenesulfonate is very stable and does not undergo thermal decomposition at molding temperatures; whereas benzyl p-toluenesulfonate is so unstable that it decomposes at room temperature within a few hours and, consequently, is useless as a molding catalyst. On the other hand, certain sulfonates such as ethyl p-toluenesulfonate undergo thermal decomposition at molding temperatures to yield an acid substance which is capable of producing the degree of acidity required to obtain a highly satisfactory and commercially acceptable "cure time" in the molding of a urea-formaldehyde composition.

Each of the sulfonates which are known to be commercially usable "potentially acid" substances has a common property which leaves something to be desired, namely, lack of stability when such a substance (contained in a urea-formaldehyde composition) is stored over a prolonged period of time. Of course, this property seldom is noticeable in the molding of a urea-formaldehyde molding composition containing such a substance when the composition has been stored for only a few weeks at room temperature. Unfortunately, urea-formaldehyde compositions cannot always be stored under ideal conditions and for short periods of time before use, and the lack of stability becomes particularly apparent when such a composition is molded after being stored for long periods of time or at high temperatures.

The principal object of the invention is to provide a thermosetting urea-formaldehyde composition containing a novel type of potentially acid substance.

Another object of the invention is to provide a thermosetting urea-formaldehyde composition containing a potentially acid substance which is very stable upon storage for long periods of time and which is capable of producing the degree of acidity required to obtain a highly satisfactory and commercially acceptable "cure time" in the molding of a urea-formaldehyde composition. More specific objects and advantages are apparent from the description, which merely discloses and illustrates the invention and is not intended to impose limitations upon the claims.

The instant invention is based on the discovery that ethylene glycol bis-(benzenesulfonate) is particularly useful as a potentially acid substance. It has been found that if ethylene glycol bis-(benzenesulfonate) is used in a urea-formaldehyde molding composition, a composition is obtained which not only is extremely stable upon storage over a prolonged period of time, but also has a highly satisfactory and commercially acceptable "cure time."

A dry thermosetting composition embodying the invention comprises a urea-formaldehyde reaction product and ethylene glycol bis-(benzenesulfonate), as a potentially acid substance. In the preferred embodiment of the invention, the dry thermosetting composition also comprises a cellulose filler.

In the preparation of a reaction product of urea and formaldehyde for use in a composition embodying the invention, the urea may be reacted either with formaldehyde or with a polymer thereof, such as paraformaldehyde. Although under some conditions it is permissible to react dry urea with dry paraformaldehyde, the reaction preferably is carried out in an aqueous solution that is approximately neutral at the start of the reaction. Since a commercial aqueous formaldehyde solution is strongly acid, a base preferably is added to bring the initial pH of the reaction solution to the desired value. Any desired base, such as sodium or potassium hydroxide or any weaker base, or an organic base such as triethanolamine may be employed. The preferred proportion of formaldehyde is three mols for every two mols of urea. Approximately two mols of formaldehyde are all that will react with each mol of urea, but an excess of formaldehyde above such maximum or a smaller proportion ranging down to about one mol of formaldehyde for each mol of urea may be used for the reaction if desired. Because of the complexity of the molecules of the reaction products that are produced, the proportion of formaldehyde actually reacting with the urea may vary freely between the limits stated. The reaction proceeds at ordinary temperatures, but heat may be used to shorten the time of reaction if desired. A reaction product may be prepared by carrying the reaction of the urea and formaldehyde only to its earliest stage, for example the stage at which the urea and formaldehyde have just been brought into solution together, or the reaction may be carried to any further stage at which the reaction product is still fusible.

The preferred method of preparing a molding composition consists in preparing an aqueous solution of a urea-formaldehyde reaction product, impregnating a cellulose filler with the solution, and then drying. Although alpha cellulose is the purest and lightest-colored cellulose filler, any other form of cellulose, such as wood flour, wood pulp, newsprint, printed newspaper, sawdust, shavings, walnut shell flour, or ground corn cobs may be used. The impregnated and dried cellulose material preferably is ground to a fine powder in order to produce a homogeneous composition, and the potentially acid substance preferably is incorporated during the grinding stage. The customary modifiers such as hotplate lubricants, opacifiers, pigments and other coloring matter also may be incorporated during the grinding. The fine powder so obtained may be formed into coarse granules, or into solid blanks or preforms of the proper sizes for use in various molds. Molded articles may be produced in the usual manner by compressing the composition in a closed mold under a pressure of one to four tons per square inch of projected area and at a temperature of 270–330° F. If cellulose material is present in a dry composition embodying the invention, the proportion thereof preferably is from about 30 to about 40 per cent, but may range to as much as 60 per cent in the case of a dense form of cellulose such as walnut shell flour. (As used herein to denote quantities of materials, the terms "parts" and "per cent" mean parts and per cent by weight unless otherwise designated.) The proportion of the potentially acid substance employed is simply that proportion which causes the hardening to take place at the desired speed. Since the potentially acid substance is a curing catalyst the usual "catalytic" amount may be used (i. e., ranging from about 0.1 to about 5 per cent of the molding composition), but the usual proportion is about one-half of one per cent of the molding composition.

Ethylene glycol bis-(benzenesulfonate) can be prepared by adding (1) 100 cc. of a cold solution of 15.5 grams of ethylene glycol in acetone and (2) 120 cc. of a cold 20 per cent aqueous sodium hydroxide solution to (3) a cold solution of 88 grams of benzene sulfonyl chloride in 500 cc. of acetone. The solutions (1) and (2) are added simultaneously and dropwise to the solution (3) which is cooled externally, e. g., in an ice bath; then the mixture is poured into 2000 cc. of water; and the precipitate which is formed is removed by filtration and washed with water. The washed precipitate is pure ethylene glycol bis-(benzenesulfonate) having a melting point of 48–49° C. Since the product so obtained is a solid substance, it can be ground into a molding composition and thoroughly dispersed more quickly and easily than a liquid potentially acid substance.

Example

After alpha cellulose fiber (80 parts by weight) has been impregnated with an aqueous solution containing 120 parts of a urea-formaldehyde reaction product, the impregnated material is dried by any of the usual drying methods. Heat may be used as is customary to expedite the drying, and drying by means of a stream of air is convenient. The dried material is ground in a ball mill together with 0.6 per cent of its weight of ethylene glycol bis-(benzenesulfonate), and any other desired modifiers. The resulting powder is usable as a molding composition for many applications but can be granulated or preformed.

One of the standard methods for checking the rate of cure of a molding composition is a water absorption test, which is based on the fact that urea-formaldehyde molded articles absorb more water if they are insufficiently cured than if they are completely cured. The water absorption test may be carried out according to the following procedure:

Molded pieces, each of which is a 2 inch diameter disc about 0.06 inch thick and weighing about 5.3 grams, are obtained by molding the composition prepared in the foregoing example at a temperature of about 308° F. in a 30 ton (two-cavity mold) hydraulic press. The pieces are held in the press under the foregoing conditions for different periods of time, such as one, two and three minutes, in order to determine the completeness of the cure which is obtained in each of these periods of time. The pieces are then immersed in boiling water for fifteen minutes and the increase in weight (i. e., the amount of water absorbed) is found to be only 0.315 gram if the piece is held in the mold for one minute; 0.175 gram if the piece is held in the mold for two minutes; and 0.165 gram if the piece is held in the mold for three minutes.

The amazing feature of the improvement obtained by the use of ethylene glycol bis-(benzenesulfonate) is particularly apparent when one compares the performance of ethylene glycol bis-(benzenesulfonate) in the practice of the invention with the performance of other sulfonates similarly used. For example, if a procedure is carried out which is the same as that described in the foregoing paragraph except that the molding composition contains 0.8 per cent of ethylene glycol bis-(p-toluenesulfonate) instead of the ethylene glycol bis-(benzenesulfonate), the water absorption of a piece held in the mold for one minute is about 33 per cent greater than that described in the foregoing paragraph.

One of the standard methods for determining the stability of urea-formaldehyde molding compositions during storage is a "duration" test. Fundamentally, such a test involves a determination of the length of time a molding composition may be held at an elevated temperature without becoming infusible to such an extent that it is no longer commercially acceptable. By observation of the "duration" times in a test using a freshly prepared molding composition and in a test using a molding composition which has been stored under certain conditions, it is possible to predict the stability of such molding composition under such conditions of storage. A "duration" test may be carried out according to the following procedure:

A ⅛ inch shim is placed between the top and bottom plates of a 20 ton hydraulic press which has a test mold that forms a tumbler or large thimble 4 inches high with a 2¼ inch bottom diameter and 3 inch top diameter, weighing about 43.5 grams and holding 300 cc. The mold is heated to a temperature of about 302° F. with 60 pounds per square inch steam line pressure. A 52 gram sample (made into a 2$\frac{1}{16}$ inch diameter pill) of the molding composition of the invention prepared in the foregoing example is placed in the mold cavity and the press is closed immediately. (The shim prevents the press from closing completely.) The "duration" of flow is 32 seconds, i. e., the maximum number of seconds that the sample may be held in the mold in the foregoing manner and still permit a 47 gram (defined weight) tumbler to be formed when the shim is removed and the full line pressure of 2,250 pounds per square inch is applied to the mold.

If a procedure is carried out which is the same as that described in the foregoing paragraph except that the molding composition is stored at 125° F. for 72 hours before being tested, the duration time is found to be reduced only to 23 seconds, thus demonstrating that the molding composition of the invention has extremely good stability.

In order to prepare a molding composition in which the ethylene glycol bis-(benzenesulfonate) is replaced by another sulfonate such as ethyl p-toluenesulfonate and which yields duration test results that are substantially the same as the foregoing, it is necessary to use such a sulfonate in an amount less than one-half as much as the amount of ethylene glycol bis-(benzenesulfonate) used in the foregoing procedure. Of course, it is always possible to increase the duration time by decreasing the amount of the potentially acid substance used, even though this necessarily results also in a decrease in the rate of cure, which is not desired.

The instant invention resides in the discovery that a urea-formaldehyde molding composition containing ethylene glycol bis-(benzenesulfonate), as a potentially acid substance, not only has excellent stability under storage conditions, but also has an excellent rate of cure in molding.

Various embodiments of the invention may be devised to meet various requirements.

Having described the invention, I claim:

1. A dry thermosetting composition comprising a urea-formaldehyde reaction product and ethylene glycol bis-(benzenesulfonate), as a curing catalyst.

2. A dry thermosetting composition comprising a urea-formaldehyde reaction product, ethylene glycol bis-(benzenesulfonate), as a curing catalyst, and a cellulose filler.

3. A dry thermosetting composition comprising a urea-formaldehyde reaction product, ethylene glycol bis-(benzenesulfonate), as a curing catalyst, and an alpha-cellulose filler.

JOHN KENSON SIMONS.

REFERENCES CITED

The following references are of record in the file of this patent:

UNITED STATES PATENTS

| Number | Name | Date |
|---|---|---|
| 2,227,708 | Cordier | Jan. 7, 1941 |